Aug. 25, 1931.  J. JANDA  1,820,457
SAW FRAME
Filed Nov. 29, 1930
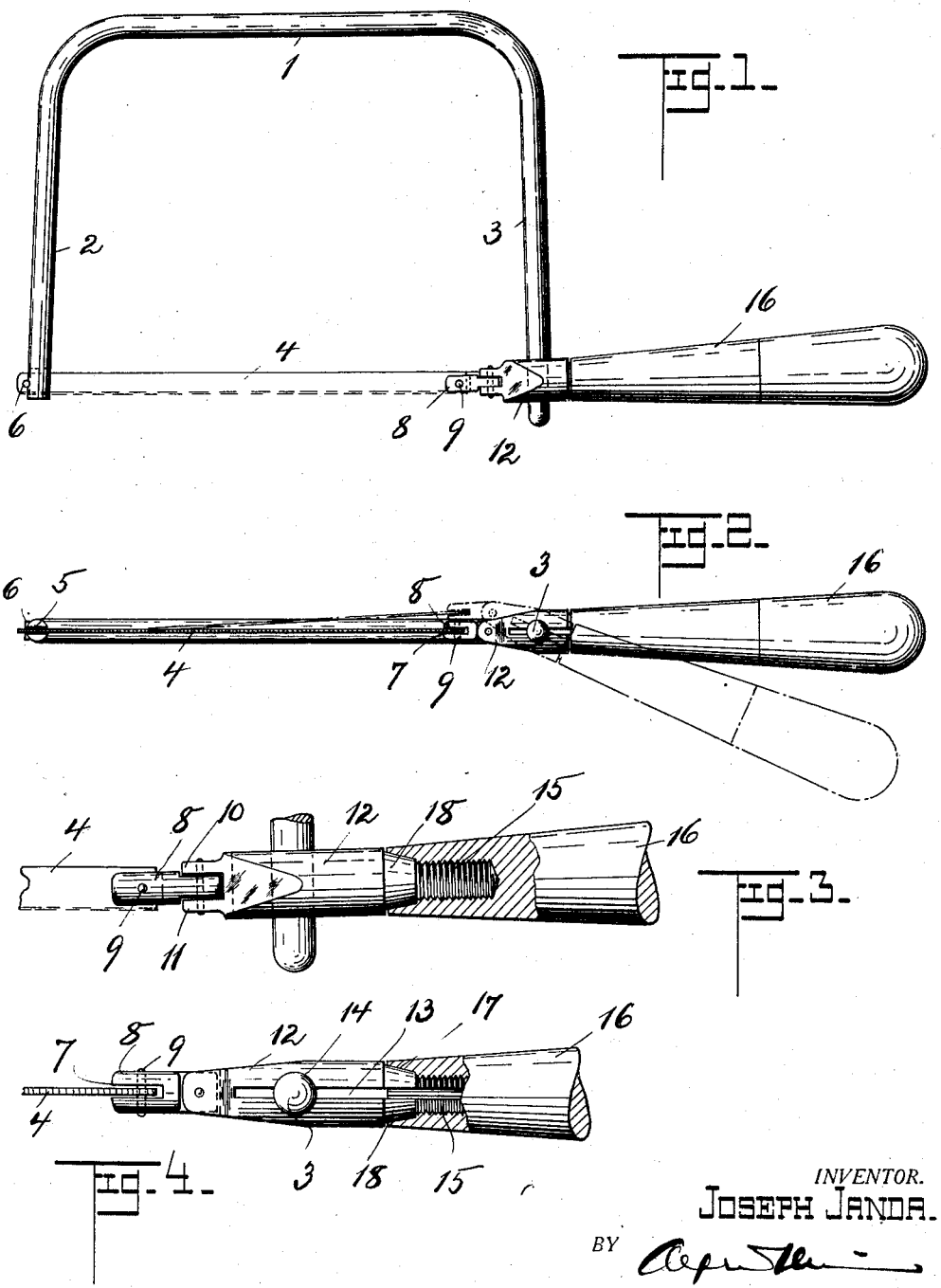

Patented Aug. 25, 1931

1,820,457

UNITED STATES PATENT OFFICE

JOSEPH JANDA, OF BROOKLYN, NEW YORK

SAW FRAME

Application filed November 29, 1930. Serial No. 498,967.

My invention relates to tool holders and more particularly to hack-saw frames, and has for its particular object to so construct the frame and the cooperating parts for holding the saw-blade as to enable anyone to readily adjust the saw-blade to different planes relative to the frame.

On the appended drawings on which I have illustrated my invention to afford a complete understanding thereof, Fig. 1 is an elevational view of a preferred embodiment of my new hack-saw frame, the saw-blade being shown in outline; Fig. 2 is an end-view of the frame when viewed from the cutting edge of the saw-blade; Fig. 3, drawn to a larger scale, shows parts of the handle whereby the saw-blade may be displaced, a portion being broken out for illustration purposes; Fig. 4 is a view similar to Fig. 3, but taken at right angles thereto.

In Fig. 1 is shown at 1 a hack-saw frame of the usual U-shape, comprising the substantially parallel arms 2 and 3. At 4 is indicated the saw-blade. The arm 2 of the frame has at its forward end a short slot 5 to receive the one end of the saw-blade 2. Through this end passes a pin 6 which bears against the outside of arm 2 which at this place is slightly notched to form a seat for the pin 6. The other end of the saw-blade is received in the slot 7 of a small member 8 in which slot the blade is held by a pin 9. The member 8 is pivotally received between the lugs 10 and 11 of a holder 12 which is slotted at 13 and provided with a round bore 14 to receive the end of the arm 3 of frame 1 so that the holder 12 may be swung about said arm in either direction at right angles to the plane of frame 1. The slot 13 extends all the way through to the outer end of holder 12, which end, as clearly shown in Figs. 3 and 4 at 15 is provided with outer screw-threads.

At 16 is shown the handle, which near its inner end is provided with female threads to fit the outer threads 15 of holder 12 so that the handle 16 can be screwed upon or unscrewed from holder 12. At its inner end handle 16 is provided with a bevelled wall 17 which fits a corresponding bevelled portion 18 formed on holder 12, so that as the handle 16 is screwed onto the holder, the slot 13 is narrowed more and more, until the holder 12 firmly grips the arm 3 of frame 1.

Now when the saw is to be used in a more or less inaccessible place, or under conditions where it would be hard to saw with the handle 16 assuming its straight position, as shown in Fig. 1 or in the full-line position of Fig. 2, the handle 16 is unscrewed to a sufficient extent to release the tight grip of holder 12 on the arm 3 of the frame, whereupon the holder, by means of handle 16 can be swung around the arm 3 in either direction to a position in which the saw-blade is displaced relative to the plane of the frame, as for instance shown by the broken lines in Fig. 2. Upon handle 16 being then screwed back again, while it is held in its new position, the holder 12 is again tightened upon the arm 3 of the frame and the saw-blade is ready for use, the sawing operation being thereby made convenient, while with handle 16 in its normal straight position, the saw could be used with difficulty only.

The angle formed by the handle 16 with the frame 1 as shown by the broken-line position of the handle in Fig. 2 can be further increased without detriment to the saw-blade or undue strains imparted thereto.

It is evident that the invention can be embodied in other constructions without any departure from its essential idea and, therefore, I do not limit myself to the construction as shown.

I also wish it to be understood that the same inventive idea may be applied to similar tool holders.

I claim:

1. In combination with a substantially U-shaped saw-frame, a blade holder slotted lengthwise so as to form two clamping members shaped to receive between them one arm of said saw-frame, and screw means cooperating with said clamping members for drawing them together into clamping engagement with said frame arm.

2. In combination with a substantially U-shaped saw-frame, a blade-holder slotted lengthwise so as to form two clamping members shaped to receive therebetween one arm of said saw-frame, said clamping members being provided with screw-threads, a handle for screw threaded engagement with said clamping members, and means whereby tightening of said handle on said members forces the latter together into clamping engagement with said arm of said frame.

3. In combination with a substantially U-shaped saw-frame, a blade-holder slotted lengthwise so as to form two clamping members shaped to receive therebetween one of the arms of said frame, said clamping members each being provided with screw threads and a bevelled portion adjacent thereto, and a handle formed with female threads to engage the screw-threads of said clamping members, said handle further being formed with a bevelled portion to engage the bevelled portions of said clamping members so as to draw the latter into clamping engagement with said arm by tightening of the handle on said members.

4. In combination with a substantially U-shaped saw frame, a blade holder slotted to provide a pair of clamping members to receive therebetween one of the arms of the saw frame, and means for drawing said clamping members together into clamping engagement with said frame arm.

5. In combination with a substantially U-shaped saw frame, a blade holder slotted to provide a pair of clamping members to receive therebetween one of the arms of the saw frame, and screw operated wedging means for drawing said clamping members together into clamping engagement with said frame arm.

In testimony whereof I affix my signature.

JOSEPH JANDA.